United States Patent [19]
Hannaford

[11] Patent Number: 5,840,346
[45] Date of Patent: *Nov. 24, 1998

[54] VISCOUS MATERIAL DISPENSING APPARATUS

[76] Inventor: Christopher S. Hannaford, 2110 Toledo Ave. North, Golden Valley, Minn. 55422

[*] Notice: The term of this patent shall not extend beyond the expiration date of Pat. No. 5,688,540.

[21] Appl. No.: 903,539

[22] Filed: Jul. 30, 1997

Related U.S. Application Data

[63] Continuation-in-part of Ser. No. 680,359, Jul. 15, 1996, Pat. No. 5,688,540, which is a continuation of Ser. No. 452,114, May 26, 1995, Pat. No. 5,536,517.

[51] Int. Cl.⁶ .............................. A23P 1/00; B29C 47/00; B67D 5/00
[52] U.S. Cl. .................. 425/382 R; 222/63; 222/263; 222/330; 425/382.4; 425/463; 426/448; 426/516
[58] Field of Search .................. 425/131.1, 200, 425/382 R, 382.4, 463; 426/516, 249, 448; 222/63, 263, 330, 643; 264/45.9, 176.1; 73/861

[56] References Cited

U.S. PATENT DOCUMENTS

| 2,680,880 | 6/1954 | Corbett | 18/12 |
|---|---|---|---|
| 3,078,513 | 2/1963 | Levison et al. | 18/12 |
| 3,649,147 | 3/1972 | Fritsch | 425/170 |
| 4,171,193 | 10/1979 | Rahlfs | 425/71 |
| 4,336,213 | 6/1982 | Fox | 264/40.1 |
| 4,900,572 | 2/1990 | Repholz et al. | 426/282 |
| 4,925,380 | 5/1990 | Meisner | 425/131.1 |
| 4,925,689 | 5/1990 | Getman | 426/289 |
| 5,019,404 | 5/1991 | Meisner | 426/249 |

Primary Examiner—George Yeung
Attorney, Agent, or Firm—Nawrocki, Rooney & Sivertson, P.A.

[57] ABSTRACT

Apparatus for positive displacement metering of viscous material. Positive displacement and non-positive pumping of material to be metered is provided. The positive displacement pumping includes pressure release apparatus to avoid excessive pressure build-up. One pressure release apparatus includes an expansion chamber to moderate pressure changes.

24 Claims, 9 Drawing Sheets

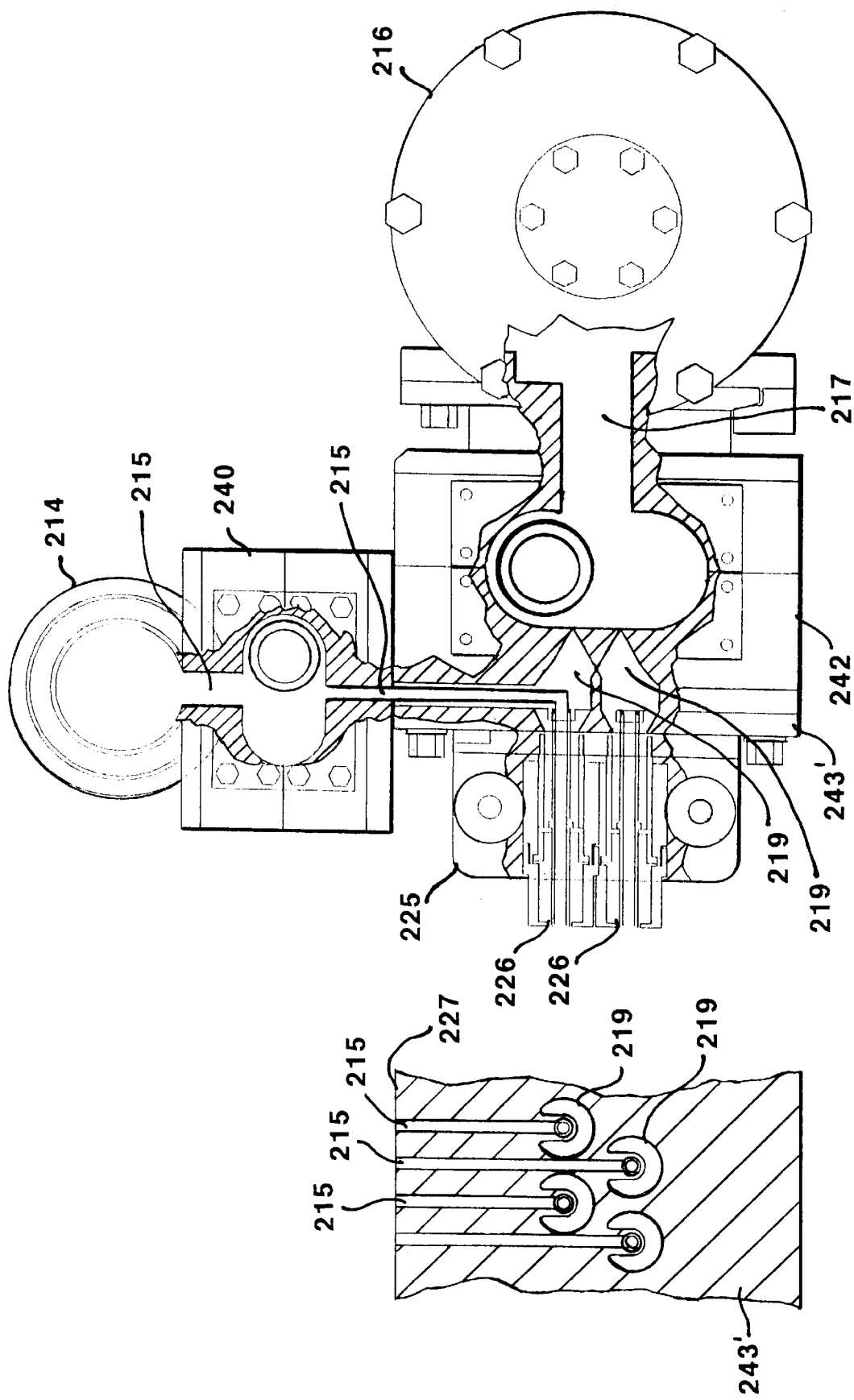

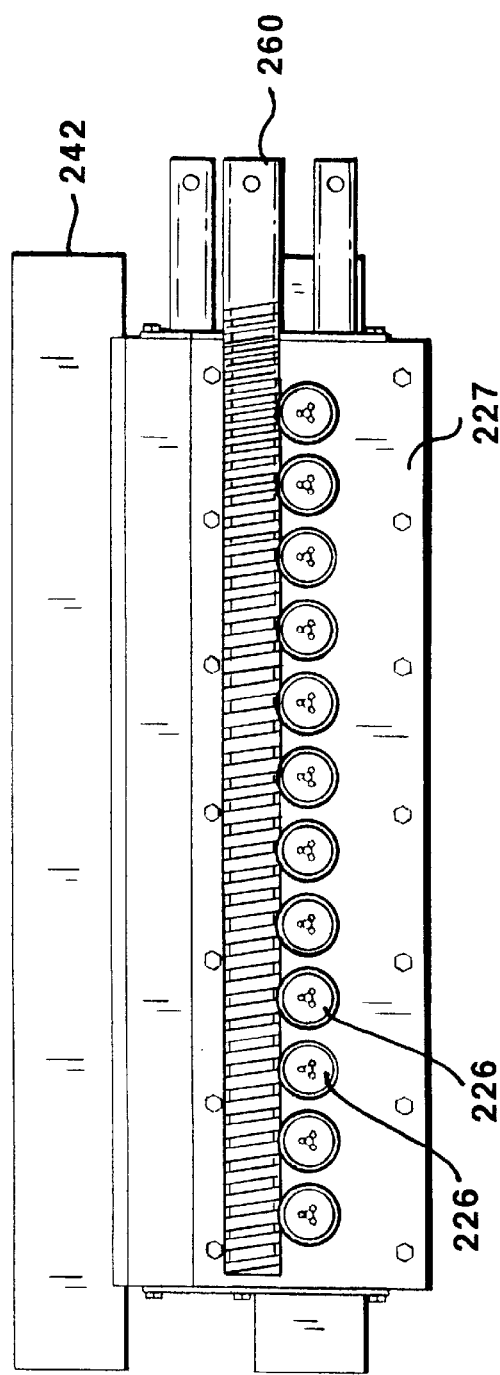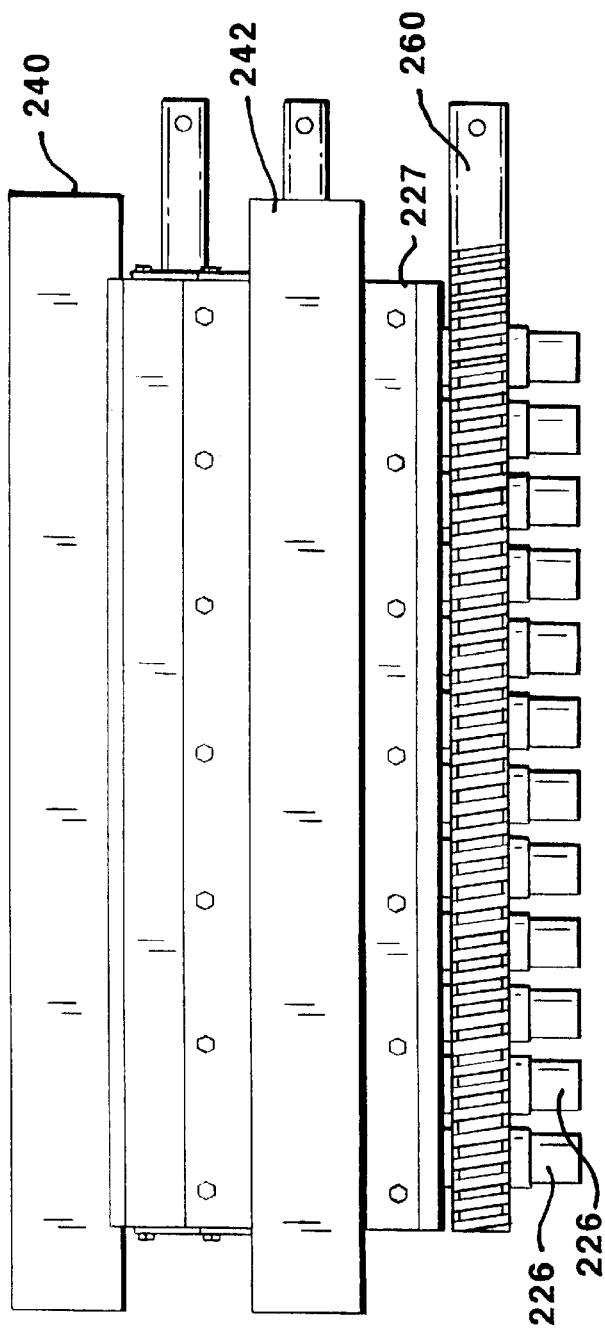
FIG.5A
FIG.5B

VISCOUS MATERIAL DISPENSING APPARATUS

CROSS-REFERENCE TO RELATED APPLICATIONS

This application is a continuation-in-part of application Ser. No. 08/680,359, filed on Jul. 15, 1996, now U.S. Pat. No. 5,688,540, which is a continuation of application Ser. No. 08/452,114, filed on May 26, 1995, now U.S. Pat. No. 5,536,517.

FIELD OF THE INVENTION

The present invention relates to the metering of viscous material. More specifically, this invention teaches the feeding of viscous material to positive displacement metering devices as well as the use of such metering devices with co-extrusion dies.

BACKGROUND OF THE INVENTION

Many extrusion processes employ a controlled flow of material from a number of dies to extrude multiple material streams. Quite often, particularly when the extruded material is a foodstuff, the extruded material is cut into predetermined lengths to represent a desired weight rather than weighing each segment. Allowance must be made for anticipated non-uniformity which results in excessive segment weights and undesirable additional cost.

The prior art has attempted to make uniform material streams from a plurality of dies by adjusting the pressure on each die, by careful die design and/or by individually adjustable valves for each die. However, in these techniques, the controlled parameter is pressure and not material flow. Any slight change in temperature, or differences from die to die in the material path to any die, will result in a difference in the amount of material extruded per unit time. Such variation will also result in variations from any given die. Further, temperature differentials tend to exponentially increase the difference in the material extruded over time. That is, higher viscosity, cooler material has a lower flow rate which allows more time for cooling which further increases the viscosity. This results in an exponential build-up and may produce a catastrophic failure—complete die blockage. This type of failure requires a disassembly of the apparatus to clean the blocked die before the process can be re-started

SUMMARY OF THE INVENTION

The present invention produces a uniform stream of material by metering the output of a pump. In particular, the present invention may be employed to provide multiple uniform streams of extruded material. In accordance with the present invention, one or more positive displacement metering devices are associated with one or more pumps and/or manifolds, the metering devices providing a metered or controlled flow of material. The metering devices may form a flow divider such as that disclosed in U.S. Pat. No. 5,536,517 issued on Jul. 16, 1996 to the inventor of the present invention or another flow divider of similar characteristics. To assure an adequate supply of material to the metering device flow divider, the pump has a greater material feed rate than the metering device/flow divider.

In a first embodiment, positive displacement pumps are employed. As indicated, the pumps deliver more material than the flow dividers can meter. Since the pumps have a positive displacement, the pressure can build to an explosive level. To maintain an essentially constant (and safe) pressure, various devices may be employed to divert or draw material from the input side of the metering device/flow divider. For example, manually adjustable relief valves (or other pressure controlled apparatus) may be employed to open a bleed or return line to the material source whenever the pressure exceeds a predetermined level. A pressure vessel with an internal bladder dividing the vessel into parts to instantaneously assist in relieving high pressures may also be employed. Other devices to draw material from the metering device/flow divider may also be employed.

In another embodiment in accordance with the present invention, non-positive displacement pumps (screw feeders, for example) provide material to the metering device/flow divider. This arrangement eliminates the necessity of relieving overpressure as described above since the pumps can only generate a limited pressure. However, in accordance with the present invention, the non-positive displacement pumps have a feed rate (no load) greater than the feed rate of the metering device/flow divider.

The various embodiments have differing modes of operation. In some instances, material pressure alone operates the flow dividers. In others, a motor supplements the energy provided by the material to drive the flow divider at an essentially constant speed to meter a constant amount of material through the flow dividers for a given time interval.

BRIEF DESCRIPTION OF THE DRAWINGS

The objects and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 4 is a side view of extrusion apparatus in accordance with the present invention showing two flow dividers and associated manifolds;

FIG. 4A is a detailed front view of coaxial co-extrusion dies and adjacent flow divider apparatus employed in the practice of the present invention;

FIG. 5A and FIG. 5B are front and top views respectively of apparatus in accordance with the present invention including coaxial co-extrusion dies and die rotating apparatus;

DETAILED DESCRIPTION OF THE INVENTION

In the context of the present specification and claims, reference to flow rate of a pump means actual flow rate or pumping rate of a positive displacement pump and no load flow rate or pumping rate of a non-positive displacement pump.

Figure 1:
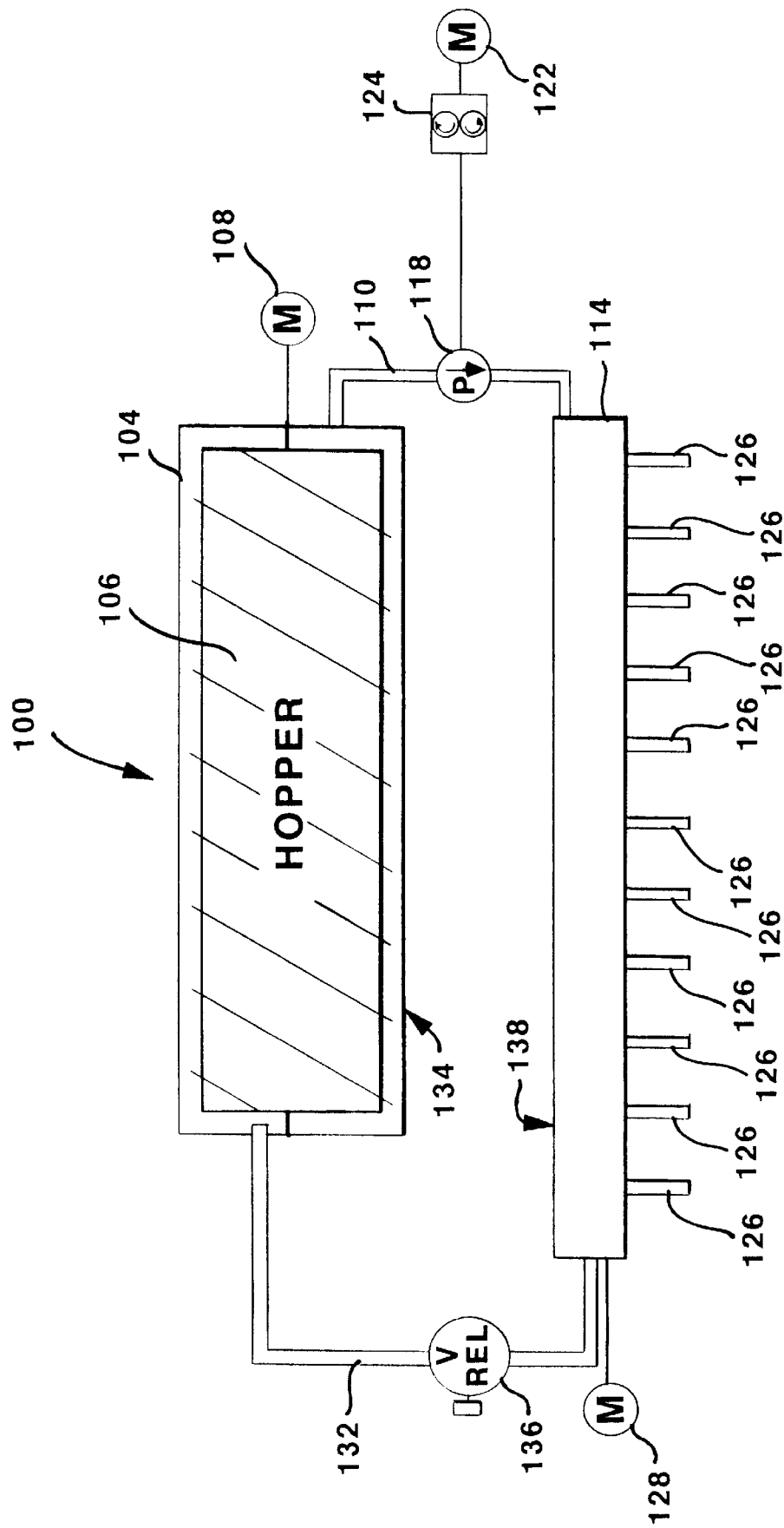
FIG. 1 is a schematic top view representation of a preferred embodiment of the present invention.

A schematic top view representation of apparatus 100 which provides material at a constant delivery pressure is shown in FIG. 1. An upwardly open hopper 104 contains material for the extrusion process. A screw 106 within hopper 104 is connected to and driven by motor 108 in a direction which will propel material within the hopper from left to right. Line 110 to manifold 114 has a gear pump 118 driven by motor 122 through gear train 124. Gear pump 118 delivers material under pressure to manifold 114. Manifold 114 communicates with flow dividers (not shown) which provide material to co-extrusion dies here illustrated as coaxial dies 126. Motor 128 powers the flow dividers which are described more fully below.

Manifold 114 is connected to the inlet of relief valve 136. Valve 136, which is manually adjustable, permits material flow through lines 132 whenever the inlet line pressure exceeds the valve setting. This provides a means for maintaining the pressure in manifold 114 at a constant pressure. The pump 118 is driven to provide more material to the manifold 114 than the flow divider can meter. This assures a constant material supply for the flow divider and a uniform flow to each die.

Figure 2:
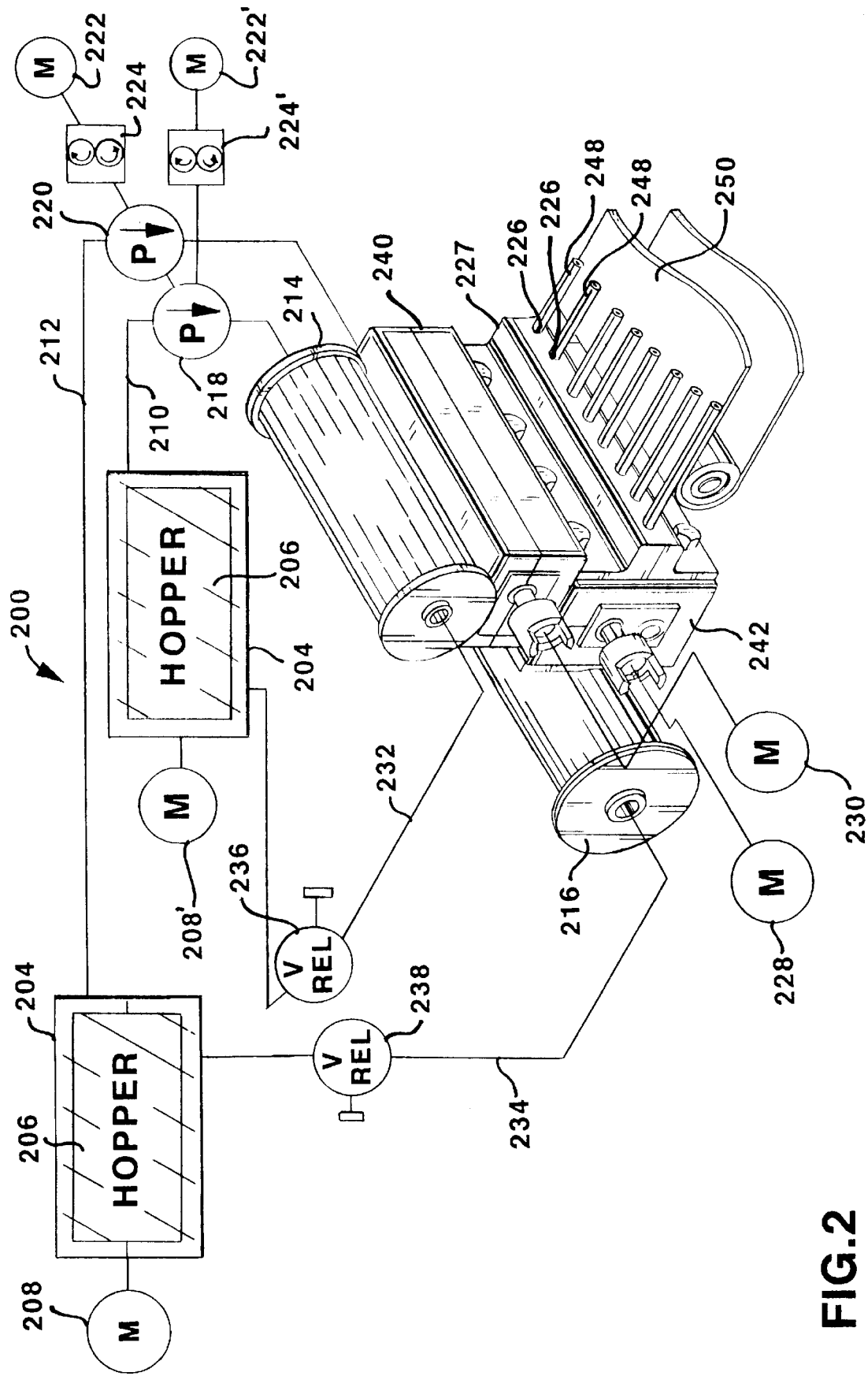
FIG. 2 shows extrusion apparatus with a schematic representation of material delivery and pressure release apparatus in accordance with the present invention.

FIG. 2 shows the same schematic relationship in the context of a co-extrusion apparatus with the extrusion apparatus itself shown in detail. In essence, FIG. 2 contains two apparatus of the type shown in FIG. 1. In FIG. 2, apparatus 200 has hoppers 204 and 204' screws 206 and 206' driven by motors 208 and 208', and lines 210 and 212 respectively feeding manifolds 214 and 216. Lines 210 and 212 have respective pumps 218 and 220 driven by motors 222 and 222' through gear trains 224 and 224'. Lines 232 and 234 respectively exit manifolds 214 and 216 and exhaust into their associated hopper 204 and 204'. Line 232 is blocked by manually adjustable valve 236 and line 234 is blocked by manually adjustable valve 238. These valves each block their respective line until the set pressure is exceeded. Manifold 214 communicates with flow divider 240 driven by motor 228, and manifold 216 communicates with flow divider 242 driven by motor 228.

Flow divider 240 communicates with the center of co-extrusion dies 226, and flow divider 242 communicates with the area around the center of the dies to provide a co-extrusion of material 248 onto conveyer belt 250. Other multi-stream co-extrusion dies are known to the prior art and may be utilized in the practice of the present invention.

Figure 3:
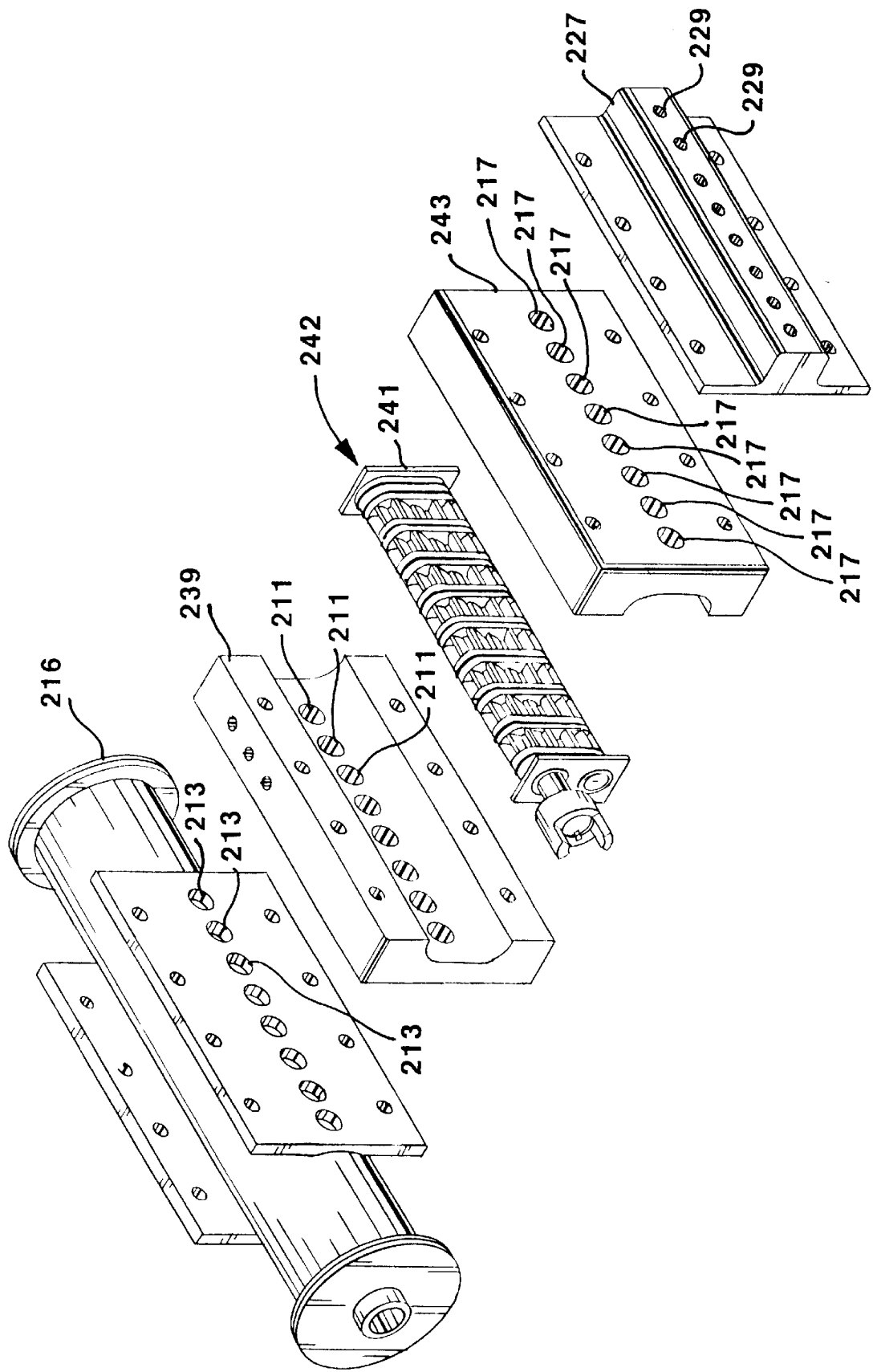
FIG. 3 is an exploded view of a flow divider and associated manifold in accordance with the present invention.

FIG. 3 shows the manifold feed and internal construction of flow divider 242, and is representative of the manifold and flow dividers shown throughout the drawings of this specification. Here manifold 216, flow divider 242 and die holder 227 are shown in exploded view. Flow divider 242 has opposed pairs of gears 241 to provide a positive displacement metering function. The upper gears are attached to a shaft while the lower gears are mounted for independent rotation (i.e., free wheeling) which synchronizes all gear pairs. Outer plate 243 and inner plate 239 have opposed recesses sized to receive gear pairs 241. Holes 213 aligned with the center of each gear pairs in manifold 216 and holes 211 in inner plate 239 provide input ducts for gear pairs 242. Holes 217 in outer plate 243 provide output ducts between gear pairs 242 and dies 229. Additional holes are provided around the periphery of these parts for bolt holes to permit bolting all parts together to provide easy disassembly for cleaning. The flow dividers shown herein are those disclosed in U.S. Pat. No. 5,536,517, issued Jul. 16, 1996, to the inventor herein, which patent is hereby incorporated by reference. Other flow dividers of similar characteristics may be employed in the practice of the present invention.

FIG. 4 shows manifolds 214 and 216 connected respectively to flow dividers 240 and 242. Ducts or flow paths 219 from flow divider 242 extend through outer plate 243' to dies 226 while flow paths 215 extend from flow divider 240 extend to dies 226. FIG. 4A shows the flow paths 215 and 219 through outer plate 243' arranged to provide material respectively to and around the center of the coaxial co-extrusion dies 226. Each die 226 is centered by pins extending radially outwardly and secured in position by a flare at the inner end which is secured by a bushing, in known manner.

In FIGS. 5A and 5B apparatus used to rotate dies 226 is shown. A shaft 260 threaded along its length is driven by a motor. Each die 226, which can be rotated around its center, has a mating thread around its periphery which engages the thread in shaft 260. Rotation of shaft 260 rotates all dies synchronously. This produces a rotation of the material as it is extruded from dies 226. If dies 226 are non-uniform in cross-section this will result in a spiral pattern along the extruded materials, in known manner.

Figure 6:
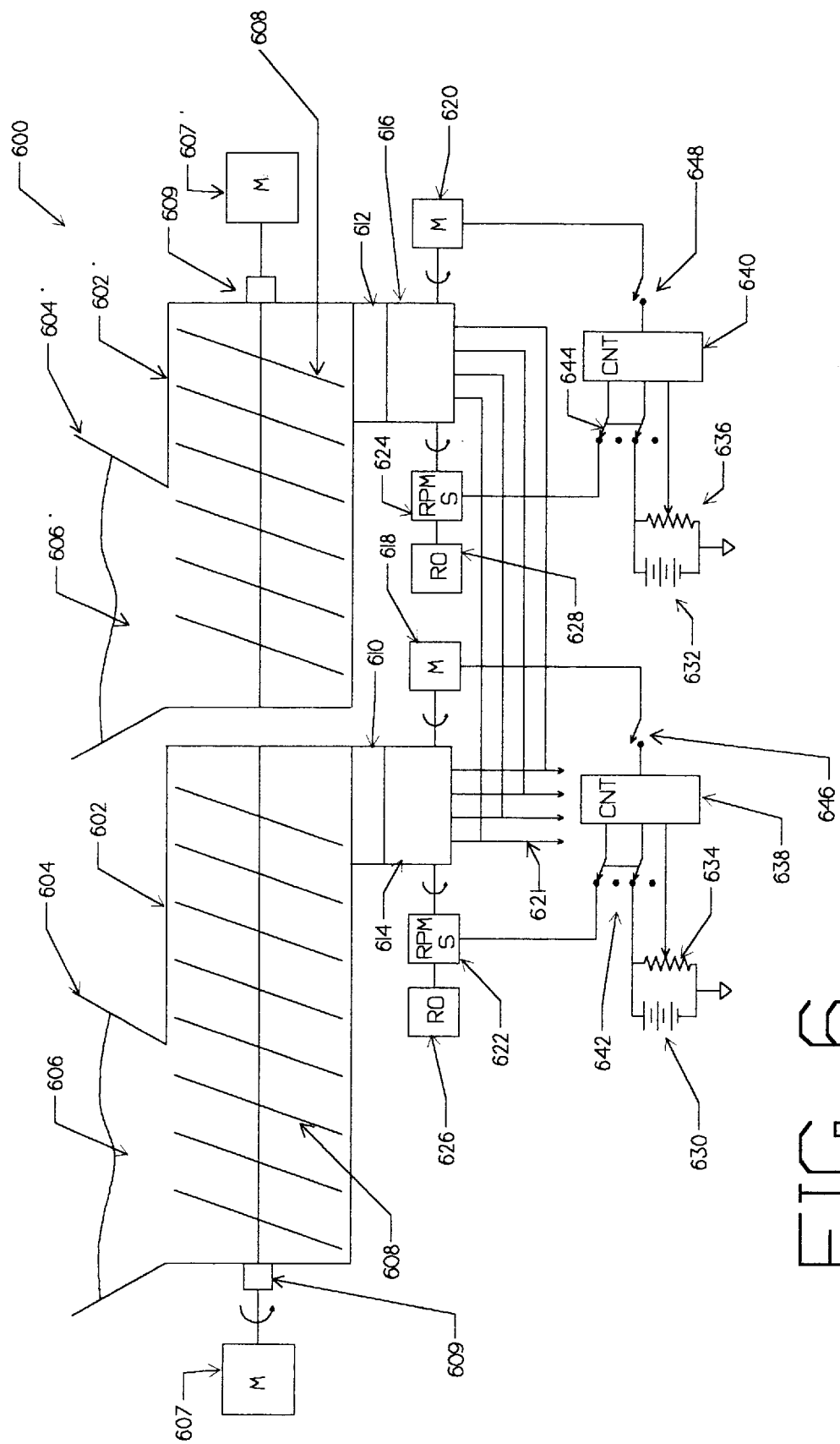
FIG. 6 is a schematic representation of a second embodiment in accordance with the present invention and various control mode options.

FIGS. 6 through 9 illustrate a number of control arrangements for the embodiments of the present invention described herein. FIG. 6 illustrates apparatus 600 having a tanks 602 and 602' with upwardly open hoppers containing extrudable material 606 and 606'. Material 606 and 606' is fed rightwardly by screw feeders 608 and 608' driven by motors 607 and 607', respectively. Manifolds 610 and 612 are attached to the bottom of tanks 602 and 602' and receive material from their associated tank through openings in the bottom of the tank, not shown. Manifold 610 feeds flow divider 614 and manifold 612 feeds flow divider 616.

Motor 618 drives the shaft of flow divider 614 and motor 620 drives flow divider 616 in the direction of rotation indicated by the arrows around their respective shafts. Rotation per minute sensors (RPMS) 622 and 624 are attached to the opposite ends of the shafts to determine the rate of rotation of the shafts, which provides an indication of the throughput or flow rate of each respective flow divider.

Read-outs (ROs) 626 and 628 provide an external indication of the throughput or flow rate of each flow divider as indicated by each respective RPMS output value.

Power supplies such as batteries 630 and 632 provide a voltage respectively to adjustable resistors 634 and 636 which, in turn, provide an input to controllers (CNTs) 638 and 640. CNTs 638 and 640 control the rotation rate of motors 626 and 628 respectively as described further below.

Double-pole single-throw switches 642 and 644 provide switching for two inputs, as shown, respectively to CNTs 638 and 640. These inputs are used to change the control operations as described below.

As described, one mode of operation does not utilize motor assist in operating flow dividers but, instead, utilizes the pressure of the material from the delivery system to provide the energy to drive the dividers. However, when a screw feeder, such as screws 608 and 608', deliver material to the flow dividers, very little pressure is produced by the screw on material fed to the manifolds. In this instance, motors, such as 618 and 620, may be employed to drive the flow dividers and force the material through coaxial dies 621. The material from flow divider 614 is extruded from the center of dies 621 and the material from flow divider 616 is extruded around the material extruded from the center, in known manner.

In this powered mode, switches 646 and 648 may be open. This results in motors 618 and 620 being uncontrolled and operating synchronously with line frequency. This will produce essentially constant rotation rates for the motors and an essentially constant flow rate from each metering device of the flow divider. The position of switches 642 and 644 are unimportant here since the output of controllers 646 and 648 are disconnected from respective motors 618 and 620.

In another powered mode of operation, RPM sensors 622 and 624 sense the rotation rate of the shafts driven by respective motors 618 and 620 and change this information into electrical signals which are provided respectively to read-outs 626 and 628 and to the upper contacts of switches 642 and 644. Read-outs 626 and 628 provide information to the operator of the flow rate of flow dividers 614 and 616 respectively. In this mode of operation the arms of switches 642 and 644 are downward such that the information from RPM sensors 622 and 624 and battery voltages 630 and 632 are disconnected from (not provided to) controllers 638 and 640. Here, the voltages from variable resistors 634 and 636 will cause controllers 638 and 640 to change the speed respectively of motors 618 and 620 in direct proportion to the voltage level provided by the voltage outputs from the respective adjustable resistors 634 and 636. The absence of the battery voltages informs the controllers that this is a third mode of operation. The operator uses the information from read-outs 626 and 628 to change flow rates of flow dividers 614 and 616 by changing the settings of adjustable resistors 634 and 636 and observing the results on read-outs 626 and 628 until the desired rates are obtained from flow dividers 614 and 616, respectively.

A further powered mode of operation is obtained when the arms of switches 642 and 644 are positioned upwardly to connect RPM sensors 622 and 624 through the upper arm of the switches (and batteries 630 and 632 through the lower arm of the switches) to controllers 638 and 640. The presence of the battery voltages informs the controllers of this mode of operation wherein controllers 638 and 640 will compare the voltages from RPM sensors 622 and 624 with the voltage from variable resistors 634 and 636 respectively, and change the speed of respective motors 618 and 620 to drive the respective differences to zero. This results in the setting of resistors 634 and 636 providing a reference rate for the motors and permits the operator to change the respective speeds of motors 618 and 620 by adjusting these resistors until the rate observed on the read-outs for each flow divider has the desired value. This arrangement provides a closed-loop servo control for the two motors with the adjustable resistors providing a means for setting the desired flow rates.

FIG. 6 is provided to illustrate the various modes of control which can be used with the system described. In actual practice, various elements will be provided in accordance with the nature of the control desired while others may be eliminated, also as desired.

Figure 7:
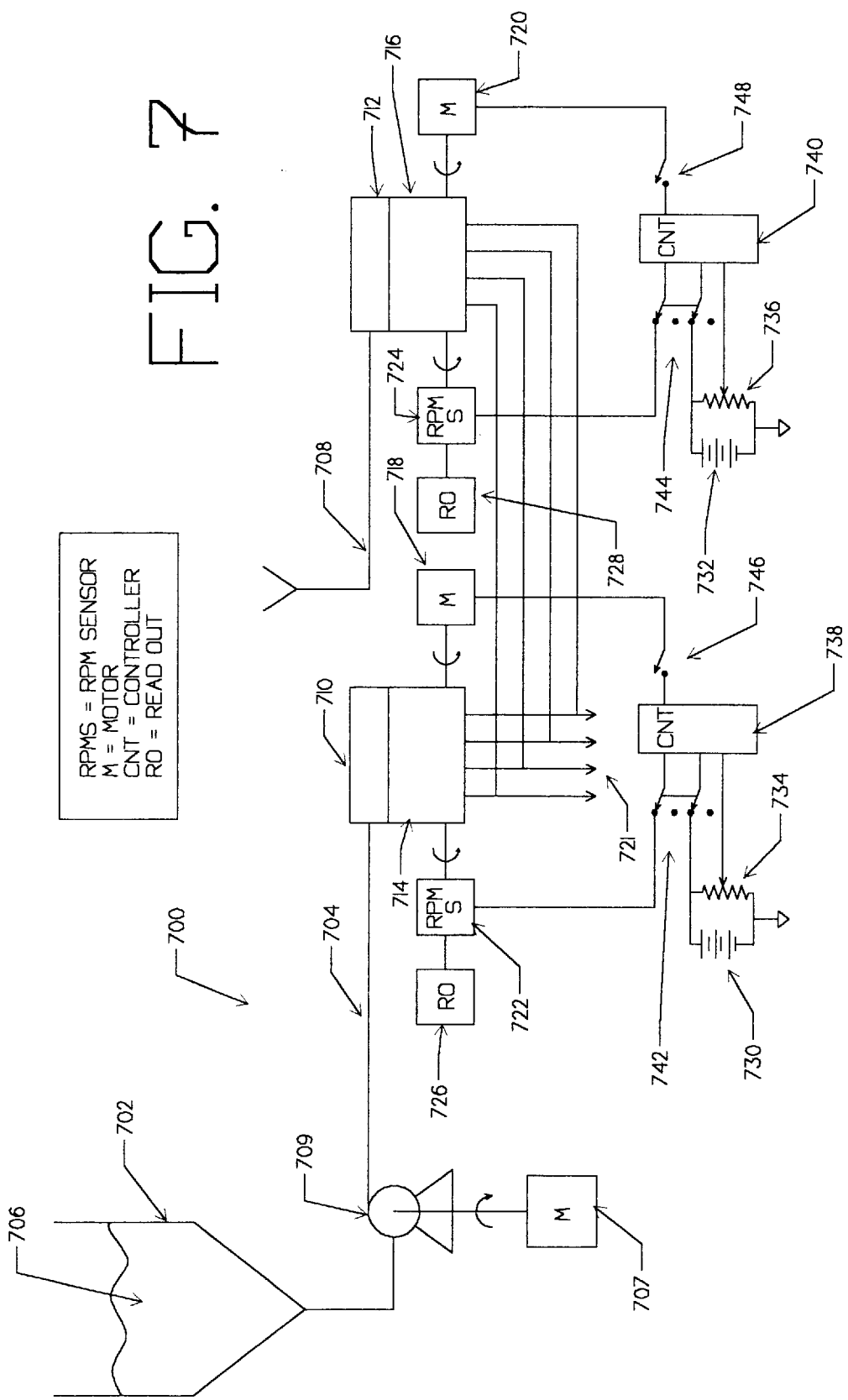
FIG. 7 is a schematic representation of another embodiment in accordance with of the present invention and various control mode options.

In FIG. 7 an alternative embodiment is shown as apparatus 700 having a tank 702 with an upwardly open hopper containing extrudable material 706 which is pumped rightwardly through lines 704 to a manifold 710 by a non-positive displacement pump such as a centrifugal pump 709 which is driven by motor 707. Line 708 similarly provides material from a hopper and pump (not shown) to manifold 712. Manifold 710 feeds flow divider 714 and manifold 712 feeds flow divider 716. In some instances, the pump feeding the manifolds 710 and 712 may be screw feeders.

In operation, the pressure provided by the pumps 709 are self-limited and no arrangement is required to relieve the pressure in manifolds 710 and 712 even though the pumps are driven at a no-load flow rate greater than the flow rate the flow divider can meter. As is known to the art, increasing pressure reduces the amount of material delivered to the manifold to provide a self-limiting pressure and pump flow rate.

The controls for the various modes of operation are the same for the apparatus of FIG. 7 as for the apparatus of FIG. 6. Motor 718 drives the shaft of flow divider 714 and motor 720 drives flow divider 716 in the direction of rotation indicated by the arrows around their respective shafts. RPMS 722 and 724 determine the rate of rotation of the shafts to indicate the extrusion rate of each flow divider. ROs 726 and 728 provide the external indication of the extrusion rate of each flow divider from their respective RPMS outputs. Batteries 730 and 732 provide a voltage respectively to adjustable resistors 734 and 736 which, in turn, provide an input to CNTs 738 and 740. CNTs 738 and 740 similarly control the rotation rate of motors 726 and 728. Double-pole single-throw switches 742 and 744 provide switching for two the inputs respectively to CNTs 738 and 740. These inputs are used to change the control operations as was described above for FIG. 6. Also, as in the embodiment of FIG. 6, the low pressure of the material supplied by the centrifugal pump is not adequate to drive the flow dividers without assistance. The operation of switches 742, 744, 746, 748 adjustable resistors 734, 736, controllers 738, 740, read-outs 726, 728, RPM sensors 722, 724 and motors 718, 720 are the same as corresponding switches 642, 644, 646, 648 adjustable resistors 634, 636, controllers 638, 640, read-outs 626, 628, RPM sensors 622, 624 and motors 618, 620 are as described above in the discussion of the apparatus of FIG. 6.

Figure 8:
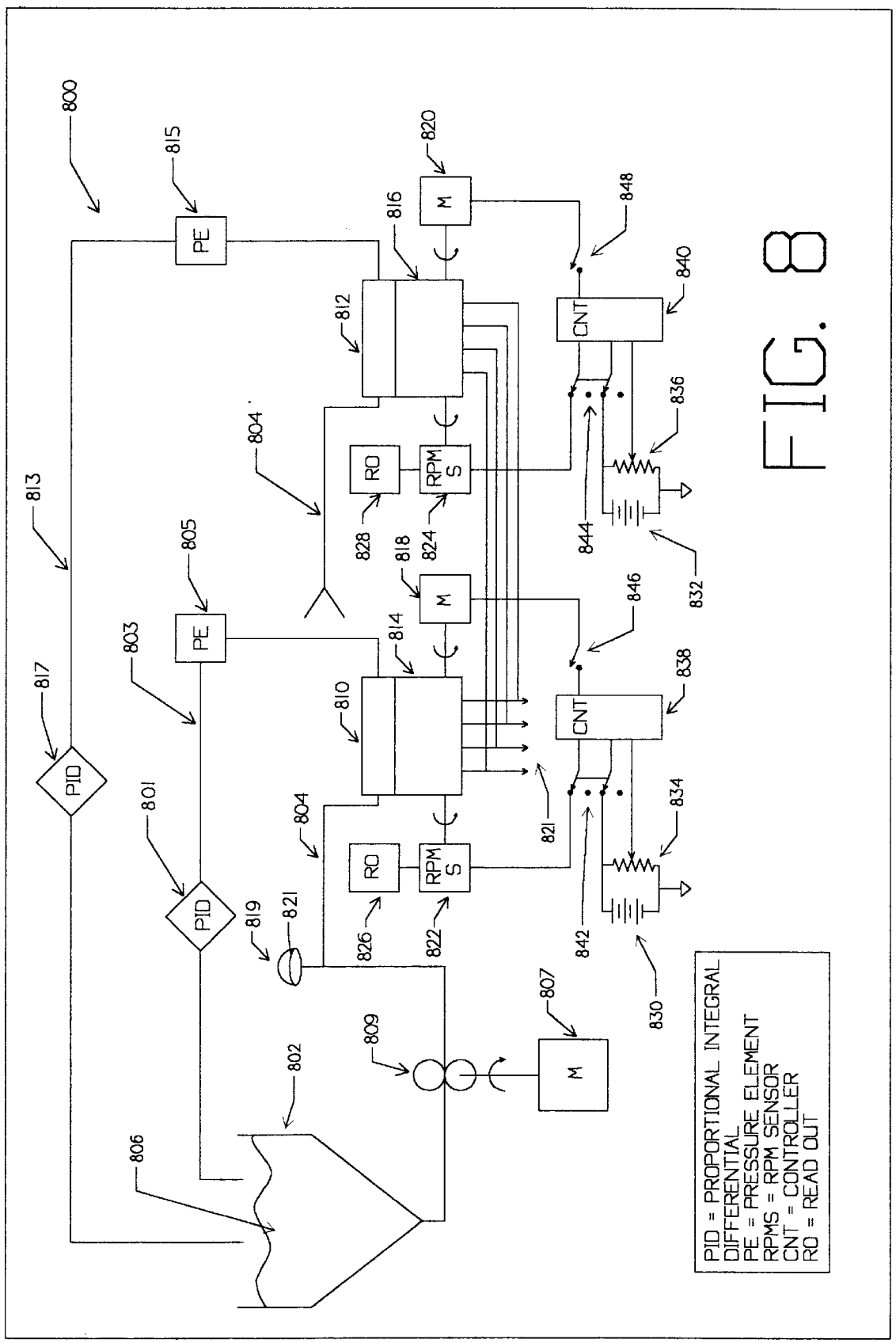
FIG. 8 is a schematic representation of a further embodiment in accordance with the present invention and various control mode options.

FIG. 8 shows another alternative apparatus 800 with a tank 802 having an upwardly open hopper containing extrudable material 806 which is pumped rightwardly by a positive displacement gear pump 809 driven by motor 807. A line 804 leads from tank 802 through pump 809 to manifolds 810 and 812 which receive the material pumped from tank 802. A pressure vessel 819 has a waterproof membrane 821 dividing the interior into two portions with the lower portion communicating with line 804. The upper portion of vessel 819 contains air and provides a means for instantaneously reducing excessive pressure within line 804. Elements similar to tank 802, pump 809, motor 807 and pressure vessel 819 feed into line 804. Manifold 810 feeds flow divider 814 and manifold 812 feeds flow divider 816.

Line 803 from manifold 810 extends through pressure-sensing element (PE) 805 and proportional integral differential (PID) feed-back controller 801 to a position over tank 802. Line 813 from manifold 812 similarly extends through PE 815 and PID 817 to a position over the tank associated with line 804'. With this arrangement whenever pressure in manifolds 810 and 812 exceeds the levels established in respective PEs 805 and 815, then PIDs 801 and 817, which otherwise would respectively block lines 803 and 813, will open and allow material to return to the supply tank thus reducing the pressure to the pre-set level.

The controls for the various modes of operation are the same for the apparatus of FIG. 8 as for apparatus of FIG. 6 and the apparatus of FIG. 7. Motor 818 drives the shaft of flow divider 814 and motor 820 drives flow divider 816 in the direction of rotation indicated. RPMSs 822 and 824 indicate the extrusion rate of each flow divider. Read-outs ROs 826 and 828 indicate the respective RPMS outputs. Batteries 830 and 832 provide a voltage respectively to adjustable resistors 834 and 836 which again, in turn, provide an input to CNT 838 and 840. CNTs 838 and 840 similarly control the rotation rate of motors 826 and 828. Double-pole single-throw switches 842 and 844 again provide switching for two the inputs respectively to CNT 838 and 840. These inputs are used to change the control operations, as described above.

Because the high pressure developed by positive displacement gear pump 809 is adequate to power the flow dividers for low viscosity materials, motors 818 and 820 need not assist in operating flow dividers 814 and 816. Material 806 for extrusion is placed in tank 802. Motor 807 drives positive displacement gear pump 809 forcing material through line 804 to manifold 810. Similar action delivers material to manifold 812 and 804'. Flow dividers 814 and 816 receive the material respectively from manifolds 810 and 812. In this control mode no power is provided to motors 818 and 820 and the energy from the pressurized material from gear pump 809 alone is used to rotate flow dividers 814 and 816. In this mode switches 848 and 848 are open. For higher viscosity materials, it may be desirable (or necessary) to power the motors 818 and 820 in which case the operation of switches 842, 844, 846, 848 adjustable resistors 834, 836, controllers 838, 840, read-outs 826, 828, RPM sensors 822, 824 and motors 818, 820 are the same as switches 842, 844, 846, 848 adjustable resistors 834, 836, controllers 838, 840, read-outs 826, 828, RPM sensors 822, 824 and motors 818, 820 are the same as the corresponding elements of the apparatus of FIGS. 6 and 7.

Figure 9:
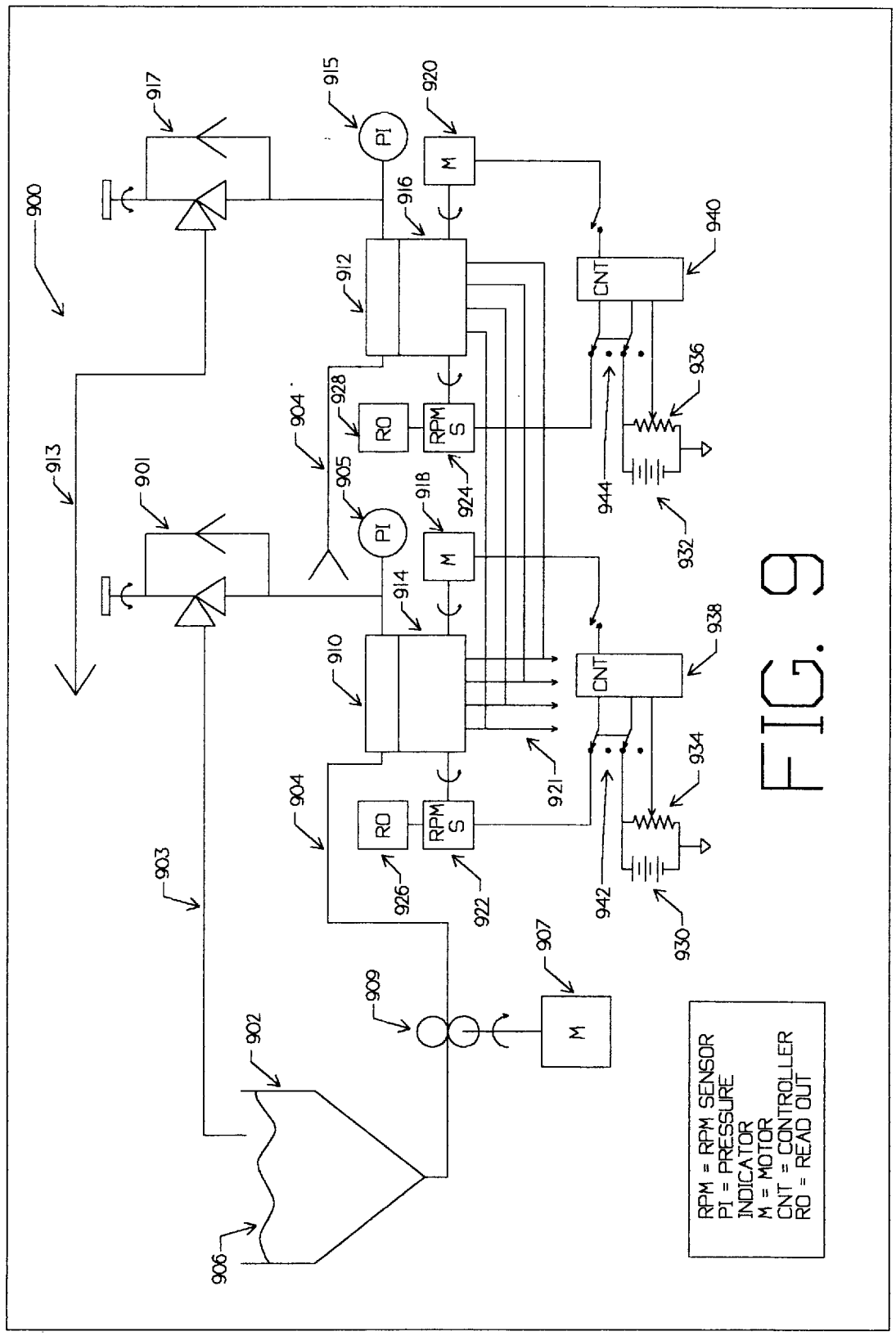
FIG. 9 is a schematic representation of a still further embodiment in accordance with the present invention and various control mode options.

FIG. 9 shows a further alternative of apparatus 900 with a tank 902 having an upwardly open hopper containing extrudable material 906 which is pumped rightwardly by a positive displacement gear pump 909 driven by motor 907. A line 904 leads from tank 902 through pump 909 to manifolds 910 which receives the material pumped from tank 902. Manifold 910 feeds flow divider 914. Similar apparatus delivers material to manifold 912. Manifold 912 feeds flow divider 916.

Line 903 from manifold 910 extends through manually adjustable relief valve 901 to a position over tank 902 and also communicates with pressure indicator (PI) 905. Line 913 from manifold 912 extends through manually adjustable pressure relief valve 917 to a position over the tank associated with line 904' and communicates with pressure indicator PI 915. With this arrangement whenever pressure in manifold 910 or 912 exceeds the levels established in respective relief valves 901 and 917 these valves, which respectively block lines 903 and 913 will open and allow material to flow back into the associated supply tank thus reducing the pressure to the manually adjusted level.

The controls for the various modes of operation for the embodiment of FIG. 9 are the same as for apparatus of FIGS. 6–8. Motor 918 drives the shaft of flow divider 914 and motor 920 drives flow divider 916 in the direction of rotation indicated. RPMSs 922 and 924 indicate the extrusion rate of each flow divider. Read-outs ROs 926 and 928 indicate the respective RPMS outputs. Batteries 930 and 932 provide a voltage respectively to adjustable resistors 934 and 936 which again, in turn, provide an input to CNT 938 and 940. CNTs 938 and 940 similarly control the rotation rate of motors 926 and 928. Double-pole single-throw switches 942 and 944 again provide switching for two the inputs respectively to CNT 938 and 940. These inputs are used to change the control operations, as described above.

In the embodiment of FIG. 9, material pressurized by positive displacement gear pump 909 may be used to rotate flow dividers 914 and 916. Switches 948 and 948 may be open. Material 906 for extrusion is placed in hopper 904 of tank 902. Motor 907 drives positive displacement gear pump 909 forcing material through line 904 to manifolds 910 and 912. Flow dividers 914 and 916 receive the material respectively from manifolds 910 and 912. Alternatively, motors 920 and 918 may be powered, as by controllers 940 and 938 to assist or control the metering of flow dividers 916 and 914.

The operation of switches 942, 944, 946, 948 adjustable resistors 934, 936, controllers 938, 940, read-outs 926, 928, RPM sensors 922, 924 and motors 918, 920 are the same as the operation of switches 842, 844, 846, 848 adjustable resistors 834, 836, controllers 838, 840, read-outs 826, 828, RPM sensors 822, 824 and motors 818, 820 of the apparatus of FIG. 8, for example.

In the powered mode of operation (motors 918 and 920 assisting flow dividers 914 and 916 respectively in metering or regulating the flow of material through coaxial dies 921), switches 946 and 948 may be open with motors 918 and 920 uncontrolled and operating synchronously with line voltage. Alternatively, the other modes of operation may be employed, as described above with reference to FIGS. 6–8.

The various described embodiments provide extremely flexible arrangements to extrude material. In addition to the illustrated examples (and as in the incorporated flow divider patent) supplemental extrudable material can be added to any or all of the flow divider input ducts. The supplemental material can be metered positively synchronized with the flow dividers or not. The supplement material addition permits the provision of flavor and/or color using a single extrusion material. Changing the metering rates can change the material cross-section from a die or can change the total cross-section volume. Also, when powered, the motors may be employed to assist the metering of material and/or to control the metering operation.

While this invention has been described with reference to illustrative embodiments, these descriptions are not intended to be construed in a limiting sense. Various modifications of the illustrative embodiment, as well as other embodiments of the invention, will be apparent to persons skilled in the art upon reference to this description. For example, the present invention has been described in the context of an extrusion process, and, most particularly, in the context of a co-extrusion process. In accordance with the present invention, the output of the metering devices/flow dividers may otherwise be shaped or discharged without departing from the present invention. It is therefore contemplated that the appended claims will cover any such modifications or embodiments as fall within the true scope of the invention.

What is claimed is:

1. Apparatus for metering viscous material which comprises:

means, including pump means, for delivering material to be metered; and flow divider means in fluid communication with said pump means, said flow divider means having multiple positive displacement metering means each having input means for receiving material to be metered and output means for discharging said metered material at a selected rate, operating energy for said metering means being obtained from the material being metered, at least one of said metering means input means receiving material to be metered from said pump means and said pump means having a feed rate greater than the rate of the discharging of the metering means.

2. The apparatus of claim 1 wherein said pump means comprises positive displacement pump means and further comprising means responsive to the pressure at said metering means input means for maintaining the pressure at said metering means input means below a predetermined level.

3. The apparatus of claim 2 wherein said pressure responsive means comprises pressure relief means.

4. The apparatus of claim 3 wherein said pressure relief means comprises means for drawing material from said material metering means input means.

5. The apparatus of claim 1 wherein said pump means comprises non-positive displacement pump means.

6. The apparatus of claim 1 wherein said metering means further comprises means for supplementing the energy provided by the material being metered.

7. Apparatus for dispensing viscous material in multiple streams which comprises:

means, including pump means, for delivering material to be dispensed;

manifold means in fluid communication with said pump means for receiving material from said pump means; and flow divider means in fluid communication with said manifold means, said flow divider means having multiple positive displacement metering means each having input means for receiving said material to be metered from said manifold means and output means for discharging said metered material at a selected rate, operating energy for said metering means being obtained from the material being metered, said pump means having a feed rate greater than the rate of discharging of the metering means.

8. The apparatus of claim 7 wherein said pump means comprises positive displacement pump means and further comprising means responsive to the pressure at said manifold means for maintaining the pressure at said manifold means below a predetermined level.

9. The apparatus of claim 8 wherein said pressure responsive means comprises pressure relief means.

10. The apparatus of claim 9 wherein said pressure relief means comprises means for drawing material from said manifold means.

11. The apparatus of claim 7 wherein said pump means comprises non-positive displacement pump means.

12. The apparatus of claim 7 further comprising a plurality of sources of material to be metered, said pump means comprising a plurality of pumps each connected to receive material from a material source and said manifold means comprising at least one manifold connected to received material from a pump.

13. The apparatus of claim 12 wherein at least one of said pumps is a positive displacement pump and further comprising means responsive to the pressure at the input means of said metering means receiving material from said positive displacement pump for maintaining the pressure thereat below a predetermined value.

14. The apparatus of claim 13 wherein said pressure responsive means comprises pressure relief means.

15. The apparatus of claim 14 wherein said pressure relief means comprises means for drawing material from said material metering means input means.

16. The apparatus of claim 12 wherein at least one of said pumps is a non-positive displacement pump.

17. The apparatus of claim 12 wherein said metering means output means comprises co-extrusion die means.

18. The apparatus of claim 7 wherein said metering means output means comprises co-extrusion die means.

19. The apparatus of claim 7 wherein said flow divider means further comprises means for supplementing the energy provided by the material being metered.

20. Apparatus for dispensing viscous material in multiple streams which comprises:

means, including pump means, for delivering material to be dispensed;

manifold means receiving material from said pump means; and flow divider means having multiple positive displacement metering means, said metering means having input means for receiving material to be metered from said manifold means and having output means for discharging said metered material at a selected rate, operating energy for said flow divider means being obtained from the material being metered, and said pump means having a feed rate greater than the rate of discharging of said flow divider means.

21. The apparatus of claim 20 wherein said pump means comprises positive displacement pump means and further comprising means responsive to the pressure at said manifold means for maintaining the pressure at said manifold means below a predetermined level.

22. The apparatus of claim 21 wherein said pressure responsive means comprises pressure relief means.

23. The apparatus of claim 22 wherein said pressure relief means comprises means for drawing material from said manifold means.

24. The apparatus of claim 20 wherein said pump means comprises non-positive displacement pump means.

* * * * *